J. W. LEASURE.
ANTISKIDDING DEVICE.
APPLICATION FILED NOV. 25, 1911.

1,100,311.

Patented June 16, 1914.

Attest:
Ewd L. Tolson
C E Parsons

Inventor.
James W. Leasure
by Spear, Middleton, Donaldson & Spear
Attys.

UNITED STATES PATENT OFFICE.

JAMES W. LEASURE, OF BRADFORD, PENNSYLVANIA.

ANTISKIDDING DEVICE.

1,100,311.  Specification of Letters Patent.  Patented June 16, 1914.

Application filed November 25, 1911.  Serial No. 662,430.

*To all whom it may concern:*

Be it known that I, JAMES W. LEASURE, citizen of the United States, residing at Bradford, Pennsylvania, have invented certain new and useful Improvements in Antiskidding Devices, of which the following is a specification.

My invention hereinafter described, is an improvement in devices for preventing skidding of automobile wheels or other vehicle wheels, and is of that class in which a revolving disk or wheel is located by the side of or between the rear driving wheels, and arranged to engage the surface of the way, when the wheels tend to skid. The particular form of the device is hereinafter fully described, and the special improvement indicated in the description and claim.

The special object of this invention is to provide a simpler and cheaper device, which is still certain and effective in operation.

My said device comprises a chock which is carried by the vehicle close to the inside of the rim or tire of the wheel, said chock being in the form of a dish-shape disk bearing on the roadway, and with its carrying arm directly interposed between the roadway surface and the wheel.

Figure 1:
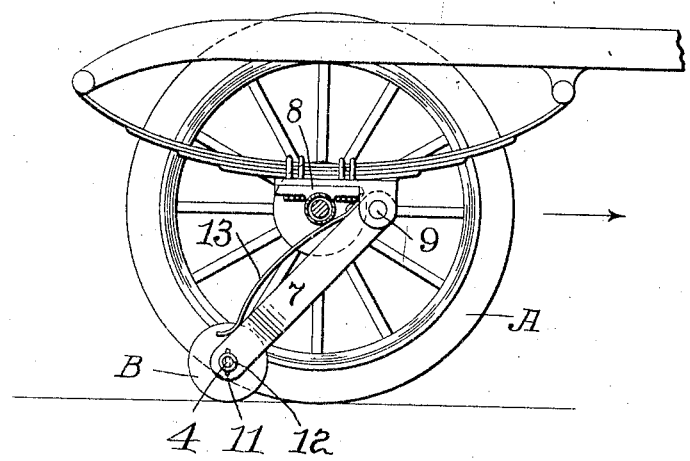
Figure 2:
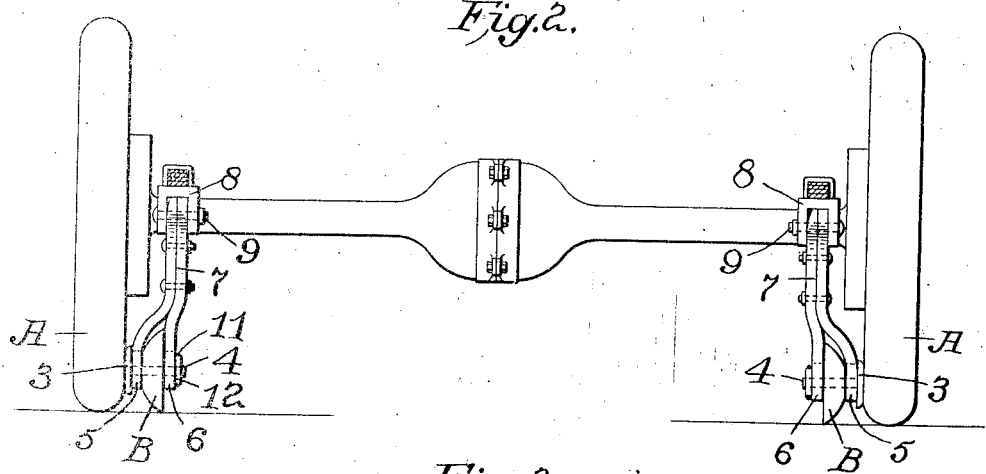
Figure 3:
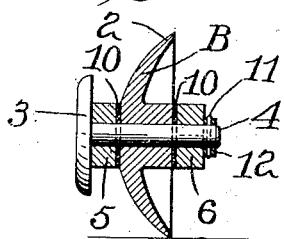

Figure 1 shows a side elevation of the device, together with the wheel to which it is applied. Fig. 2 shows a rear view of a pair of automobile wheels, with the device in its proper relation to each. Fig. 3 shows a diametrical section of my anti-skidding disk.

In these drawings the wheels marked A, A, represent the rear or driving wheels of an ordinary motor vehicle, mounted and driven in the usual manner.

The chock is shown in the form of a disk marked B, one arranged on the inner side of each wheel. It is mounted to freely rotate, and as shown in Fig. 3, is of dish shape, having an inclined marginal rim or flange 2, the edge of which projects inward and normally rides on the roadway. It is made sufficiently sharp, so that, when the disk is laterally pressed, as in skidding, it will engage the surface of the said roadway, and prevent further lateral movement. To this end the disk is mounted close to the inner side of its wheel, and with its contact edge adjacent the point of contact of the wheel with the ground. Each disk is mounted loosely on a pin having an anti-friction roller head 3, which bears on the side of the tire of the wheel of the automobile. These anti-friction roller-heads are coaxial with the main anti-skidding disks each having a journal pin 4 to rotate in bearings 5, 6, of the supporting arms 7, which are clipped to the springs of the vehicle at 8, the arms being pivoted to the clips at 9. The anti-friction rollers are formed rigid with their journal pins and, of course, rotate when in contact with the rim of the wheel. The anti-skidding disks B are rotatably mounted on the journal pins of the anti-friction rollers. Fiber washers are employed at 10 and a holding pin and collar at 11, 12. The arms carrying the disks are pressed downwardly by springs.

The arms 7 incline rearwardly, as shown in Fig. 1, from their pivotal points, and carry the disks at their lower ends. The function of these arms is mainly to trail the disks and hold them in position close to the inside of the rim of the wheel. The lateral thrust of either anti-skidding disk due to the skidding is sustained by the anti-friction roller head bearing against the rim of the wheel.

In the operation of the device when the machine skids, the anti-skidding disk which presents its dished face or gripping edge in the direction of the skidding movement will grip the surface of the roadway and prevent the lateral movement of the car. As just stated, the lateral thrust during this action will be borne by the anti-friction roller bearing on the rim of the wheel, said roller acting as a boss to bear directly on the wheel. On the other side of the machine the anti-skidding disk will simply slide over the surface of the roadway, its sloping or beveled side having no gripping effect on the roadway. The pivoted supporting arm will hold this disk in position in relation to the wheel ready to act should skidding take place in the other direction. The supporting arm is sufficiently strong for this purpose, but as above intimated, it does not have to take the thrust when the anti-skidding disk grips the road. I do not limit myself to the pivoted arms as the means of supporting the anti-skidding devices, as other means for supporting and controlling the same may be used. Chains or other connections may be used for lifting the arms when desired. The disks may be small, and made of steel, as they serve simply as chocks, as explained.

I claim:

In combination with a motor vehicle, an arm pivotally mounted in proximity to the rear wheel thereof, said arm being forked at its lower end, a pin journaled in the forked end of said arm, a rotary chock rotatably mounted on said pin between the depending ends of said forked arm, said pin being provided at its outer end with an anti-frictional roller head disposed co-axially with said chock, and a spring adapted to press on said arm to normally cause the rotary chock to bear on the roadway and the said roller head to bear with its lower edge against the inner side of the rim of the wheel, substantially as described.

In testimony whereof, I affix my signature in presence of two witnesses.

JAMES W. LEASURE.

Witnesses:
F. P. SCHOONMAKER,
E. M. KOCH.